(12) United States Patent
Kotwicki

(10) Patent No.: US 6,510,746 B1
(45) Date of Patent: Jan. 28, 2003

(54) GAS FLOW MEASUREMENT

(75) Inventor: Allan Joseph Kotwicki, Williamsburg, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/351,600

(22) Filed: Jul. 12, 1999

(51) Int. Cl.[7] .............................. G01F 1/37; G01F 1/00
(52) U.S. Cl. ..................... 73/861.52; 702/45; 702/100
(58) Field of Search .................. 73/861.52, 3, 861.42, 73/861.54, 861, 861.01, 863.03; 123/571; 374/36; 702/20–24, 27, 30–32, 45, 47, 50, 100, 138, 140, 127, 128, 134, 143, 170, 183

(56) References Cited

U.S. PATENT DOCUMENTS

| | | | | |
|---|---|---|---|---|
| 3,752,393 A | * | 8/1973 | Moseley | 700/285 |
| 4,074,573 A | * | 2/1978 | Nordhofen | 702/47 |
| 4,290,404 A | | 9/1981 | Hata et al. | |
| 4,390,001 A | | 6/1983 | Fugimoto | |
| 4,406,161 A | | 9/1983 | Locke et al. | |
| 4,562,744 A | | 1/1986 | Hall et al. | |
| 4,829,449 A | * | 5/1989 | Polesnak | 702/45 |
| 5,107,441 A | * | 4/1992 | Decker | 702/47 |
| 5,226,728 A | * | 7/1993 | Heyden | 374/36 |
| 5,347,843 A | | 9/1994 | Orr et al. | |
| 5,493,512 A | * | 2/1996 | Peube et al. | 702/47 |
| 5,613,479 A | | 3/1997 | Gates et al. | |

OTHER PUBLICATIONS

"Experimental Methods for Engineers" J.P. Holman, pp. 184–236, Second Edicition, McGraw–Hill Book Company.
"The Internal–Combustion Engine in Theory and Practice", vol. 1: Thermodynamics, Fluid Flow, Performance, Second Edition, Revised, The MIT Press, by C. f. Taylor.
Holman, Experimental Methods for Engineers, $2^{nd}$ Edition, 1966., pp. 185–236.

* cited by examiner

*Primary Examiner*—Harshad Patel
(74) *Attorney, Agent, or Firm*—Allan J. Lippa; John D. Russell

(57) ABSTRACT

A method for approximating compressible flow is described that is applicable across any pressure range of interest uses upstream and downstream pressure. The approximation minimizes variance with respect to a true flow equation. A flow control system is given using the new method that achieves accurate control with minimum complexities. The control system is application to various systems, including internal combustion engine airflow control, internal combustion engine exhaust gas recirculation control, internal combustion engine alternative fuel flow control, and many other compressible flow control problems.

19 Claims, 2 Drawing Sheets

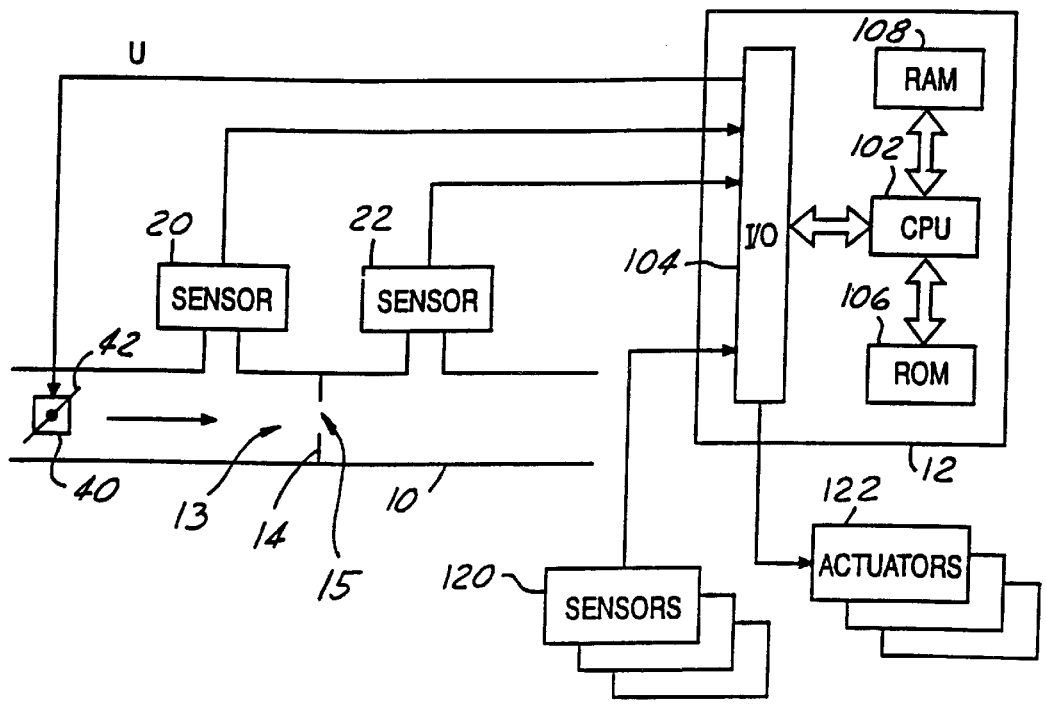
FIG. 1
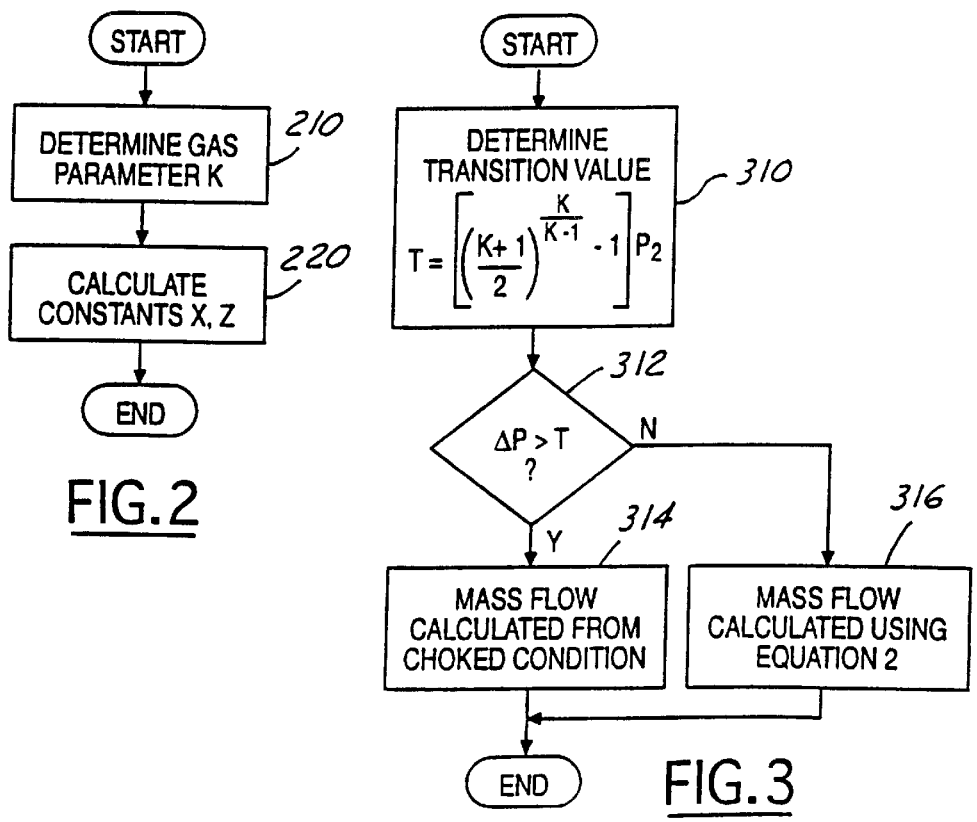
FIG. 2
FIG. 3

GAS FLOW MEASUREMENT

FIELD OF THE INVENTION

The present invention relates to a system and method to measure gas flow using upstream and downstream pressure measurements, and in particular to measurement of flows related to internal combustion engine operation.

BACKGROUND OF THE INVENTION

Determining compressible gas flow from pressure measurements is commonly performed using the known adiabatic orifice compressible flow equation shown in the following equation, referred to herein as a true flow function.

$$\dot{m} = A_o \sqrt{\frac{2k}{k-1}} \sqrt{\frac{MW}{RT_1}} \, p_1 \sqrt{r^{\frac{2}{k}} - r^{\frac{k+1}{k}}} \quad \text{equation 1}$$

$$r = \begin{cases} \dfrac{p_2}{p_1} & \dfrac{p_2}{p_1} > \left(\dfrac{2}{k+1}\right)^{\frac{k}{k-1}} \\ \left(\dfrac{2}{k+1}\right)^{\frac{k}{k-1}} & \text{otherwise} \end{cases}$$

where, $\dot{m}$ is mass flow rate, $A_o$ is orifice area, MW is molecular weight of gas flowing through the orifice, k is the ratio of specific heats, $p_2$ is downstream pressure, $p_1$ is upstream pressure and T1 is upstream temperature. The variable, r, can take on two values depending on the ratio of downstream to upstream pressure. When the ratio is greater than a certain value, flow is said to be subsonic and the upper equation is followed. When the ratio is less than a certain value, flow is said to be sonic, or choked, and the lower equation is followed.

However, due to complex exponents and corresponding difficulties in cost effective implementation of the above equation in digital computers that run at high speed, approximations to the adiabatic orifice compressible flow equation are commonly sought.

One approximation to equation 1 is given in terms of differential pressure between upstream and downstream conditions and downstream pressure. The known equation is given as:

$$\dot{m} = A_o \sqrt{2} \sqrt{\frac{MW}{RT_1}} \sqrt{a(\Delta p)p_2 - b(\Delta p)^2}$$

where, a is given as 1 and b is given as $$\left(\frac{1.5}{k} - 1\right)$$

and $\Delta p = p_1 - p_2$. Such a method is described by Holman in, *Experimental Methods for Engineers*, 2$^{nd}$ Edition, 1966.

The inventor herein has recognized several disadvantages with the above approximation. In particular, the above approximation has a limited region of applicability as stated by Holman. In other words, the above approximation only resembles the true flow function in a limited operation region when using the fixed values of a and b stated by Holman. Another disadvantage is that the prior art approximation is invalid during subsonic operation and no corresponding transition point is given in terms of variables $\Delta p$ and $p_2$. Another disadvantage is that values of a and b stated by Holman are only applicable for small area ratios between orifice area and pipe area.

SUMMARY OF THE INVENTION

An object of the invention claimed herein is to provide a flow measurement method for measuring compressible flow using an approximation that is useful over all operating conditions and used in conjunction with various gas types.

The above object is achieved, and problems of prior approaches overcome, by A method for determining a flow of a compressible gas through an orifice, the method comprising: determining first and second constants based on an error between a flow approximation and a true flow function, wherein said flow approximation is based on said first constant, said second constant, an upstream pressure variable, a downstream pressure variable, and a differential pressure variable; calculating an actual differential pressure between an actual upstream pressure and an actual downstream pressure; and calculating a compressible gas flow based on said actual upstream pressure, said actual downstream pressure, said actual differential pressure, and said first and second constants using said flow approximation.

By using an approximation according to the present invention, not only can extremely accurate approximations be achieved, but the approximations are valid over all pressure conditions. In other words, the approximation of this form can be used in pressure ranges under which the prior art produced inaccurate results and therefore in pressure ranges in which the prior art discouraged approximations. In fact, the approximation according to the present invention achieves higher accuracy than the prior art in all pressure ranges, including those ranges in which the prior art approach is taught to be useful.

An advantage of the above aspect of the invention is that more accurate flow measurement is obtained across all pressure ranges.

Another advantage of the above aspect of the invention is that the more efficient real time software is obtained.

Other objects, features and advantages of the present invention will be readily appreciated by the reader of this specification.

BRIEF DESCRIPTION OF THE DRAWINGS

The object and advantages described herein will be more fully understood by reading an example of an embodiment in which the invention is used to advantage, referred to herein as the Description of the Preferred Embodiment, with reference to the drawings wherein:

FIG. 1 is a block diagram of a flow system in which the invention is used to advantage;

FIGS. 2–4 are a high level flowcharts of various routines for controlling EGR flow.

DESCRIPTION OF AN EMBODIMENT

Figure 4:
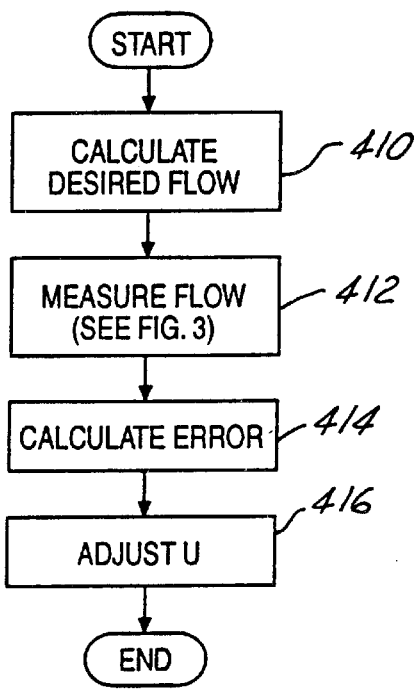

The present application is related to the following patent application having a common inventor which is co-owned by the same assignee: "Flow Measurement and Control," Ser. No. 09/226,681 filed Jan. 11, 1999, now U.S. Pat. No. 6,308,694 which are incorporated herein by reference.

A flow measurement system is shown in FIG. 1. Pipe 10 represents a flow passage in which a compressible fluid medium (not shown) flows. Pipe 10 has flow area ($A_p$) 13. For example, fluid medium may comprise air, exhaust gas from an internal combustion engine, air having evaporated fuel therein, or any other compressible gas substance. The fluid medium flows in the direction indicated by arrow 11. The medium flows through orifice 14, which may comprise any type of flow obstruction such as, for example, a sharp edged orifice, a venturi, or a chamfered orifice. Orifice 14 has flow area ($A_o$) 15 which represents the area through which the medium may pass. Upstream pressure ($p_1$) is measured by sensor 20. Downstream pressure ($p_2$) is measured by sensor 22. Alternatively, only one of upstream or downstream pressure may be measured if the differential pressure ($\Delta p$) is also measured, where differential pressure is defined as $\Delta p = p_1 - p_2$. The sensors 20,22 comprise known pressure sensor.

Throttle 42 is an additional obstruction in the flow path that is used to control fluid medium flow. Throttle 42 creates a variable area obstruction. Increasing throttle area increases flow, while decreasing throttle area decreases flow. Throttle 42 is shown upstream of orifice 14, but may also be placed downstream of orifice 14.

Continuing with FIG. 1, Controller 12 is shown in FIG. 1 as a conventional microcomputer including: microprocessor unit 102, input/output ports 104, read-only memory 106, random access memory 108, and a conventional data bus. Controller 12 is shown receiving various signals from sensors 120. Controller 12 is also shown sending various signals to actuators 122. In addition, controller 12 receives an indication of upstream pressure ($p_1$) from sensor 20 and downstream pressure ($p_2$) from sensor 22. Controller 12 also sends signal u to throttle actuator 40 coupled to throttle 42.

In a preferred embodiment of the present invention, the gas flow is approximated using the following equation, referred to herein as a flow approximation:

$$\dot{m} = A_o \sqrt{\frac{2k}{k-1}} \sqrt{\frac{MW}{RT_1}} \sqrt{(Xp_1 + Zp_2)(\Delta p)} \quad \text{equation 2}$$

Here, the constants X and Z are determined as described later herein with particular reference to FIG. 2.

Referring now to FIG. 2, a routine for determining constants X and Z is described. The only changing parameter in this routine is gas property related parameter, k, which represents the ratio of specific heats. Therefore, this routine need only be executed when the method will be applied to a gas with a different value of k. In step 210, ratio of specific heats k is determined for the gas flowing through orifice 14. Then, in step 220, constants X and Z are determined. A preferred method determines constants X and Z by minimizing variance between the approximation of equation 2 and the assumed true value in equation 1. In this embodiment, the constants are given as:

The above equation gives coefficients X and Z in explicit matrix form to be evaluated by those of ordinary skill in the art. The integrals can easily be numerically approximated. For example, for k=1.4, the constants are given as: $X = -1.932 \times 10^{(-2)}$ and $Z = 0.3049$. These constants represent the minimum variance between equation 1 and equation 2. In other words, these constants provide the minimum value of the integrated squared error.

According to the present invention, flow determined using equation 2 accurately and simply approximates flow using equation 1. This accurate and simple calculation achieves these results by determining constants (X,Z) such that error is minimized between an the approximation and a true flow function. Measurements of actual pressure values are not requires for determining constants (X,Z), only the approximation form is needed. Thus, knowing the form of equation 2, i.e. the relationship between constants, pressures, and other variables, it is possible to find constants (X,Z) to have minimum error.

In an alternative embodiment, where only a single type of gas flows through orifice 14, constants X and Z need only be determined a single time according to any of the methods of the present invention.

In another alternative embodiment, constants X and Z can be calculated to minimize the maximum error, or solve a minimax problem as is known to those skilled in the art. This can be done numerically by finding constants X and Z that give the minimum value of the maximum error.

Referring now to FIG. 3, a routine is described for estimating mass flow. In step 310 transition value (T) is calculated according to the following equation:

$$T = \left[ \left( \frac{k+1}{2} \right)^{\frac{k}{k-1}} - 1 \right] p_2$$

Then, in step 312, a determination is made as to whether differential pressure ($\Delta p$) is greater than transition value (T). The above equation for (T) is used to advantage when sensors provide downstream pressure and differential pressure. When the answer to step 312 is YES, the mass flow is calculated in step 314 according to the choked flow equation known to those skilled in the art and described previously herein. When the answer to step 312 is NO, the mass flow is calculated in step 316 according to the present invention as shown in equation 2. According to the present invention, equation 2 with coefficients X and Z is applicable for any upstream pressure $p_1$ and downstream pressure $p_2$ combination such that:

$$\begin{bmatrix} X \\ Z \end{bmatrix} = \begin{bmatrix} \dfrac{4\left(1 - \left(\frac{2}{k+1}\right)^{3\frac{k}{k-1}}\right)}{\left(1 - \left(\frac{2}{k+1}\right)^{\frac{k}{k-1}}\right)^4} & \dfrac{-6\left(1 - \left(\frac{2}{k+1}\right)^{2\frac{k}{k-1}}\right)}{\left(1 - \left(\frac{2}{k+1}\right)^{\frac{k}{k-1}}\right)^4} \\ \dfrac{-6\left(1 - \left(\frac{2}{k+1}\right)^{2\frac{k}{k-1}}\right)}{\left(1 - \left(\frac{2}{k+1}\right)^{\frac{k}{k-1}}\right)^4} & \dfrac{12\left(1 - \left(\frac{2}{k+1}\right)^{\frac{k}{k-1}}\right)}{\left(1 - \left(\frac{2}{k+1}\right)^{\frac{k}{k-1}}\right)^4} \end{bmatrix} \begin{bmatrix} \int_{\left(\frac{2}{k+1}\right)^{\frac{k}{k-1}}}^{1} \dfrac{r^{\frac{2}{k}} - r^{\frac{k+1}{k}}}{1-r} dr \\ \int_{\left(\frac{2}{k+1}\right)^{\frac{k}{k-1}}}^{1} \dfrac{r^{\frac{2}{k}} - r^{\frac{k+1}{k}}}{1-r} r\, dr \end{bmatrix}$$

$$\Delta p < \left[\left(\frac{k+1}{2}\right)^{\frac{k}{k-1}} - 1\right] p_2$$

For example, for k=1.4 this is:

$\Delta p < 0.9 p_2$

Thus, the approximation is applicable over the entire pressure range where flow is subsonic.

Referring now to FIG. 4, a method for controlling flow using a flow measurement approximation according to the present invention is described. In step 410, a desired flow is calculated. The desired flow can be calculated in various ways depending on specific applications. For example, if the flow is fresh air entering an internal combustion engine, the desired flow may be calculated based on a desired engine torque. Next, in step 412, the actual flow is measured as described previously herein with particular reference to FIG. 3. Then, in step 414, the routine calculates an error between the desired flow and the approximated flow. Then, in step 416 this error is used to adjust the control signal u. The process of step 416 may be any control method known to those skilled in the art, such as, for example, a PID controller.

Figure 5:
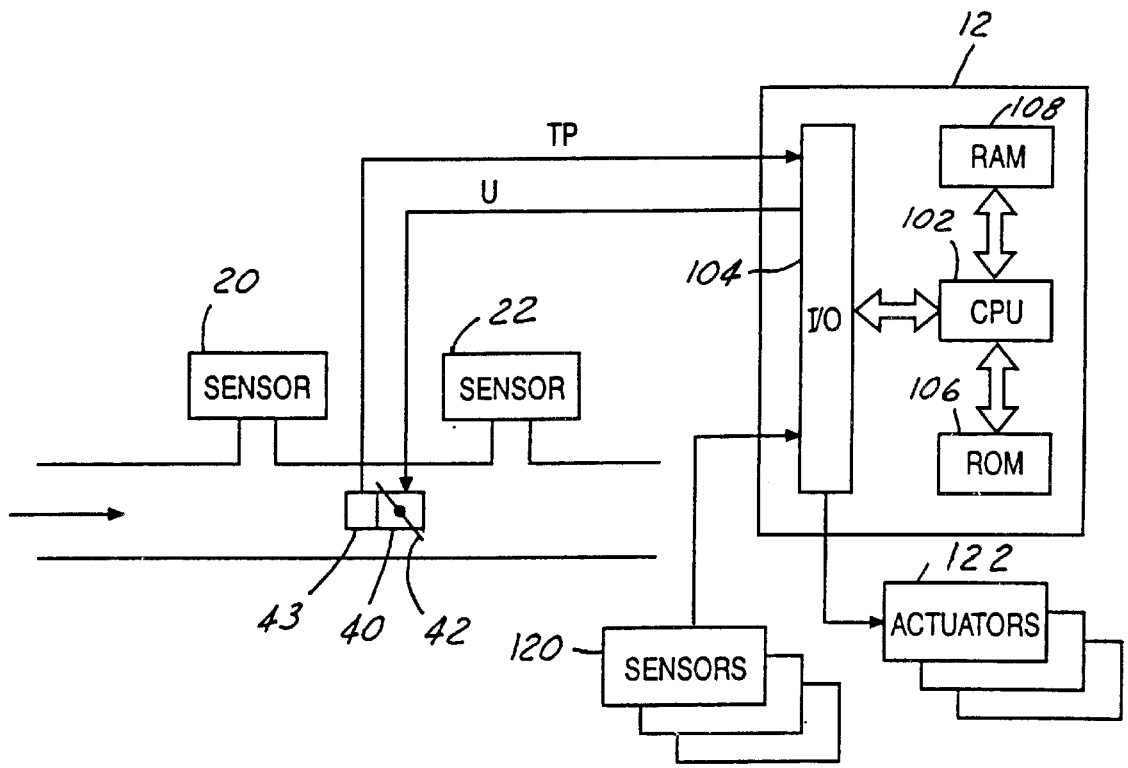
FIG. 5 is an alternate embodiment of the present invention.

Referring now to FIG. 5, an alternative embodiment is shown where throttle 42 acts as the obstruction. Here, the orifice area ($A_o$) is determined from the throttle position (TP), measured by sensor 43. The relationship between signal (TP) and area ($A_o$) can be determined geometrically or experimentally.

The above method is also applicable when including the area ratio from orifice area ($A_o$) to pipe area ($A_p$). In this case the true function known to those skilled in the art is given as:

$$\dot{m} = A_o \sqrt{\frac{2k}{k-1}} \sqrt{\frac{MW}{RT_1}} \, p_1 \sqrt{\frac{r^{\frac{2}{k}} - r^{\frac{k+1}{k}}}{1 - r^{\frac{2}{k}}\left(\frac{A_o}{A_p}\right)^2}}$$

$$r = \begin{cases} \frac{p_2}{p_1} & \frac{p_2}{p_1} > r_{crit} \\ r_{crit} & \text{otherwise} \end{cases}$$

where, $r_{crit}$ is a function of area ratio and k. Specifically, $r_{crit}$ is found by solving the following equation:

$$\frac{\partial}{\partial r_{crit}} \sqrt{\frac{r_{crit}^{\frac{2}{k}} - r_{crit}^{\frac{k+1}{k}}}{1 - r_{crit}^{\frac{2}{k}}\left(\frac{A_o}{A_p}\right)^2}} = 0$$

As example solutions, the approximate values for specific area ratios are shown in the table below:

| $\frac{A_o}{A_p}$ | $r_{crit}$ |
|---|---|
| 0 | .528 |
| .1 | .530 |
| .2 | .533 |
| .3 | .540 |
| .4 | .550 |
| .5 | .564 |
| .6 | .583 |
| .7 | .610 |
| .8 | .650 |

The flow approximation used in step 314 is unchanged, i.e., equation 2 is still used. However, in step 220 coefficients X and Z are calculated to minimize variance as:

$$\begin{bmatrix} X \\ Z \end{bmatrix} = \begin{bmatrix} 4\frac{\alpha^2 + \alpha + 1}{(1-\alpha)^3} & -6\frac{\alpha - 1}{(1-\alpha)^3} \\ -6\frac{\alpha + 1}{(1-\alpha)^3} & \frac{12}{(1-\alpha)^3} \end{bmatrix} \begin{bmatrix} \int_\alpha^1 \frac{r^{\frac{2}{k}} - r^{\frac{k+1}{k}}}{\left(1 - \beta^2 r^{\frac{2}{k}}\right)(1-r)} dr \\ \int_\alpha^1 \frac{r^{\frac{2}{k}} - r^{\frac{k+1}{k}}}{\left(1 - \beta^2 r^{\frac{2}{k}}\right)(1-r)} r \, dr \end{bmatrix} \quad \text{equation 3}$$

where $$\beta = \frac{A_o}{A_p}$$

and α is the corresponding critical value $r_{crit}$ for the given area ratio. In an alternative embodiment, the limits of integration in equation 3 can be changed so that error is minimized over a smaller range. Thus, the method can be made more accurate over a smaller region, if, for example, only this smaller region is of interest.

As an example, for k=1.4, according to the present invention, the values are found to be:

| $\frac{A_o}{A_p}$ | $r_{crit}$ | X | Z |
|---|---|---|---|
| 0 | .528 | $-1.932 \times 10^{-2}$ | .305 |
| .1 | .530 | $-2.843 \times 10^{-2}$ | .325 |
| .2 | .533 | $-2.851 \times 10^{-2}$ | .325 |
| .3 | .540 | $-2.866 \times 10^{-2}$ | .325 |
| .4 | .550 | $-6.475 \times 10^{-2}$ | .401 |
| .5 | .564 | $-.104$ | .476 |
| .6 | .583 | $-.176$ | .608 |
| .7 | .610 | $-.323$ | .855 |
| .8 | .650 | $-.697$ | 1.424 |

Thus, according to the present invention, flow can be accurately measured using a flow approximation rather than the true flow function, thereby achieving reduced computational complexity.

This concludes the description of the Preferred Embodiment. The reading of it by those skilled in the art would bring to mind many alterations and modifications without departing from the spirit and scope of the invention. For example, many additional corrections may be applied to the flow approximation method of the present invention. For example, various temperature corrections can be included. These additional temperature corrections can be easily added to the method of the present invention without difficulty. The present invention approximates the pressure related terms of compressible flow. Accordingly, it is intended that the scope of the invention be limited by the following claims.

I claim:

1. A method for determining a flow of a compressible gas through an orifice, the method comprising the steps of:
    determining values of a first and second constants based on an error between a mass flow approximation equation and a true mass flow equation, wherein said mass flow approximation equation is parameterized by said first constant, said second constant, an upstream pressure variable, a downstream pressure variable, and a differential pressure variable;
    calculating an actual differential pressure value between an actual upstream pressure value and an actual downstream pressure value; and
    calculating a compressible gas flow based on said actual upstream pressure value, said actual downstream pressure value, said actual differential pressure value, and said first and second constant values using said mass flow approximation equation.

2. The method recited in claim 1 wherein said step of determining values of said first and second constant further comprises determining values of said first and second constant based on said error between said mass flow approximation equation and said true mass flow equation, said mass flow approximation equation being parameterized by a product of said first constant and said upstream pressure variable, a second product of said second constant and said downstream pressure variable, and a third product of said differential pressure variable and a sum of said first and second products.

3. The method recited in claim 2 wherein said step of determining values of said first and second constant further comprises determining values of said first and second constant based on said error between said mass flow approximation equation and said true mass flow equation, said mass flow approximation equation being further parameterized by an area ratio between an orifice area and a pipe area through which the gas flows.

4. The method recited in claim 1 wherein said step of determining values of said first and second constant further comprises the step of obtaining a minimum error between said mass flow approximation equation and said true mass flow equation.

5. The method recited in claim 4 wherein said step of determining values of said first and second constant further comprises determining values of said first and second constant based on said error between said mass flow approximation equation and said true mass flow equation, said mass flow approximation equation being further based on an area ratio between an orifice area and a pipe area through which the gas flows.

6. The method recited in claim 1 wherein said step of determining values of said first and second constant further comprises the step of obtaining a minimum of a maximum error between said mass flow approximation equation and said true mass flow equation.

7. The method recited in claim 1 further comprising the step of using said calculated compressible gas flow to control an element that affects the flow of the compressible gas.

8. The method recited in claim 1 wherein said step of calculating compressible gas flow further comprises calculating compressible gas flow through a throttle plate of an internal combustion engine.

9. The method recited in claim 1 wherein said step of calculating compressible gas flow further comprises calculating compressible gas flow through an exhaust gas recirculation valve of an internal combustion engine.

10. The method recited in claim 1 further comprising the step of switching to an alternate flow calculation method based on a comparison of said actual differential pressure value and a transition value.

11. The method recited in claim 10 wherein said switching step further comprises switching to said alternate flow calculation method based on said comparison of said actual differential pressure value and said transition value, said transition value being based on said actual downstream pressure value.

12. The method recited in claim 1 further comprising the step of switching to an alternate flow calculation method based on a comparison of said actual differential pressure value and a transition value, wherein said transition value is based on said actual downstream pressure value.

13. A method for determining a flow of a compressible gas through an orifice, the method comprising the steps of:
    determining values of a first and second constant based on an error between a mass flow approximation equation and a true mass flow equation to obtain a minimum error between said mass flow approximation equation and said true mass flow equation, wherein said mass flow approximation equation is parameterized by said first constant, said second constant, an upstream pressure variable, a downstream pressure variable, and a differential pressure variable;
    calculating an actual differential pressure value between an actual upstream pressure value and an actual downstream pressure value; and calculating a compressible gas flow based on said actual upstream pressure value, said actual downstream pressure value, said actual differential pressure value, and said first and second constant values using said mass flow approximation equation.

14. The method recited in claim 12 wherein said determining step further comprises determining values of said first and second constant to obtain said minimum error between said mass flow approximation equation and said true mass flow equation, said mass flow approximation equation being parameterized by a product of said first constant and said upstream pressure variable, a second product of said second constant and said downstream pressure variable, and a third product of said differential pressure variable and a sum of said first and second products.

15. The method recited in claim 14 wherein said determining step further comprises determining values of said first and second constant to obtain said minimum error between said mass flow approximation equation and said true mass flow equation, said mass flow approximation equation being further parameterized by an area ratio between an orifice area and a pipe area through which the gas flows.

16. The method recited in claim 13 further comprising the step of using said calculated compressible gas flow to control an element that affects the flow of the compressible gas.

17. The method recited in claim 13 wherein said step of calculating compressible gas flow further comprises calculating compressible gas flow through a throttle plate of an internal combustion engine.

18. The method recited in claim 13 wherein said step of calculating compressible gas flow further comprises calculating compressible gas flow through an exhaust gas recirculation valve of an internal combustion engine.

19. A method for determining compressible gas flow through an orifice, the method comprising the steps of:

calculating values of a first and second constant based on an error value between a first mass flow equation and a second mass flow equation, wherein said second mass flow equation is parameterized by said first constant, said second constant, an upstream pressure variable, a downstream pressure variable, and a differential pressure variable;

calculating an actual differential pressure value between an actual upstream pressure value and an actual downstream pressure value; and calculating the compressible gas flow based on said actual upstream pressure value, said actual downstream pressure value, said actual differential pressure value, and said first and second constant values using said second mass flow equation.

\* \* \* \* \*